(12) United States Patent
Jin et al.

(10) Patent No.: US 8,055,896 B2
(45) Date of Patent: Nov. 8, 2011

(54) TAG GENERATION METHOD IN BROADCAST ENCRYPTION SYSTEM

(75) Inventors: Weon-il Jin, Suwon-si (KR);
Maeng-hee Sung, Seoul (KR);
Dae-youb Kim, Seoul (KR); Hwan-joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1086 days.

(21) Appl. No.: 11/406,254

(22) Filed: Apr. 19, 2006

(65) Prior Publication Data

US 2006/0236099 A1 Oct. 19, 2006

Related U.S. Application Data

(60) Provisional application No. 60/672,550, filed on Apr. 19, 2005.

(30) Foreign Application Priority Data

Dec. 5, 2005 (KR) .................. 10-2005-0117724

(51) Int. Cl.
*H04L 29/06* (2006.01)
(52) U.S. Cl. .................................... 713/158
(58) Field of Classification Search .............. 713/158
See application file for complete search history.

(56) References Cited

U.S. PATENT DOCUMENTS

| 5,873,078 | A | * | 2/1999 | Angle et al. ............... 707/3 |
|---|---|---|---|---|
| 7,340,603 | B2 | | 3/2008 | Asano |
| 7,369,554 | B1 | * | 5/2008 | Modelski et al. ........ 370/392 |
| 7,373,503 | B2 | * | 5/2008 | Nakano et al. ........... 713/158 |
| 7,426,639 | B2 | * | 9/2008 | Ishiguro .................. 713/175 |
| 2002/0133701 | A1 | | 9/2002 | Lotspiech et al. |
| 2002/0147906 | A1 | | 10/2002 | Lotspiech et al. |
| 2005/0220304 | A1 | * | 10/2005 | Lenoir et al. ............. 380/255 |

FOREIGN PATENT DOCUMENTS

| JP | 13186119 | 9/2006 |
|---|---|---|
| WO | 2007/000711 A2 | 1/2007 |

* cited by examiner

*Primary Examiner* — Jeffrey D Popham
(74) *Attorney, Agent, or Firm* — Sughrue Mion, PLLC

(57) ABSTRACT

A tag generation method for generating tags used in data packets in a broadcast encryption system is provided. The method includes detecting at least one revoked leaf node; setting a node identification (node ID) assigned to at least one node among nodes assigned node IDs at a layer 0 and to which the at least one revoked leaf node is subordinate, to a node path identification (NPID) of the at least one revoked leaf node at the layer 0; generating a tag list in the layer 0 by combining the NPID of each of the at least one revoked leaf nodes at the layer 0 in order of increment of node IDs of the corresponding at least one revoked leaf nodes; and generating a tag list in a lowest layer by repeatedly performing the setting and generation operation down to the lowest layer.

23 Claims, 4 Drawing Sheets

TAG GENERATION METHOD IN BROADCAST ENCRYPTION SYSTEM

CROSS-REFERENCE TO RELATED APPLICATION

This application claims the benefit under 35 U.S.C. §119 (a) from U.S. Provisional Patent Application No. 60/672,550, filed in the U.S. Patent and Trademark Office on Apr. 19, 2005, and priority from Korean Patent Application No. 10-2005-0117724, filed on Dec. 5, 2005, in the Korean Intellectual Property Office, the entire disclosures of which are incorporated herein by reference.

BACKGROUND OF THE INVENTION

1. Field of the Invention

Methods and apparatuses consistent with the present invention relate to tag generation in a broadcast encryption (BE) system. More particularly, the present invention relates to a tag generation method in a BE system for efficiently reducing a tag size.

2. Description of the Related Art

The broadcast encryption (BE) system enables a transmitter, that is, a broadcast center, to effectively transmit information only to intended users among all users. The BE should be available effectively whenever a set of the intended users arbitrarily and dynamically changes. An important property of the BE is to revoke or exclude an unintended device or user, for example, an illegal user or an expired user.

In order to revoke pr exclude an unintended device or user, each device stores a different key set assigned to that particular device, and a service provider stores the whole key set of the all devices.

Various schemes have been suggested for such a BE system. Generally, the BE system employs a layered node structure. Alternatively, the BE system may be implemented using a hierarchical hash-chain broadcast encryption scheme (HBES).

Figure 1:
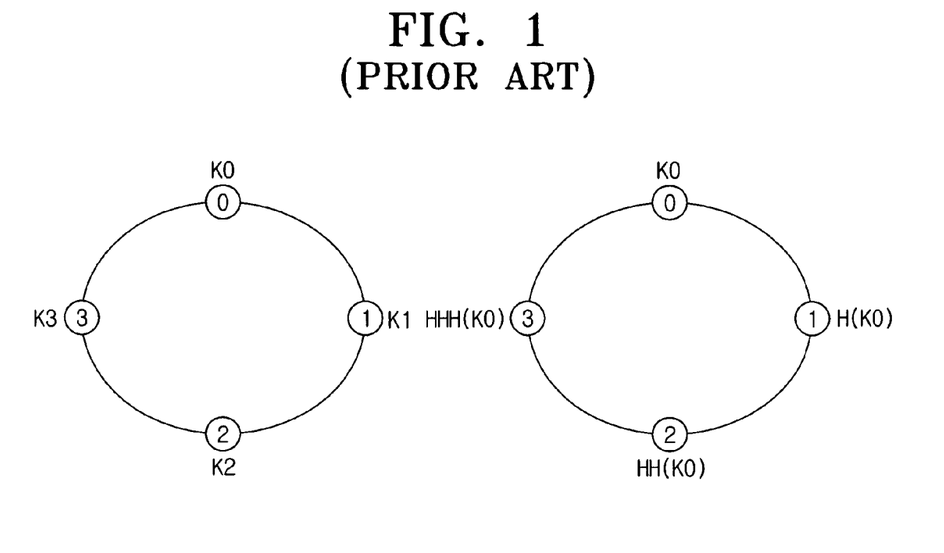
FIG. 1 is a diagram illustrating assigning keys to nodes in a conventional BE system.

FIG. 1 depicts how to assign keys to nodes, respectively, in a conventional BE system. Referring to FIG. 1, nodes 0 through 3 are arranged in a circle. The respective nodes 0 through 3 correspond to users in the BE system. Each node i is assigned a unique node key Ki. In other words, the node key K0 is assigned to the node 0, the node key K1 is assigned to the node 1, the node key K2 is assigned to the node 2, and the node key K3 is assigned to the node 3.

To enable private communications between or among authorized users, a certain key shared only by the authorized users should be assigned to the nodes of the circular structure. For doing this, the unique keys assigned to the nodes are consecutively applied to a one-way hash function to generate key values, that is, key sets. The generated key values are assigned to the nodes, respectively, in a manner as shown in Table 1.

TABLE 1

|  | Node 0 | Node 1 | Node 2 | Node 3 |
|---|---|---|---|---|
| Key set | K0 | H (K0) | HH (K0) | HHH (K0) |
|  | HHH (K1) | K1 | H (K1) | HH (K1) |
|  | HH (K2) | HHH (K2) | K2 | H (K2) |
|  | H (K3) | HH (K3) | HHH (K3) | K3 |

In Table 1, 'H' denotes the one-way hash function, and HH(K0)=H(H(K0)). The one-way hash function takes an input value of an arbitrary length and produces an output value of a fixed length. The one-way hash function has properties such that it is infeasible to find the input value using a given output value, and it is impossible to find another input value that produces the same output value as a given input value. In addition, it is impossible to find two different arbitrary input values that produce the same output value.

As mentioned above, the hash function is a function that is advantageously applied for data integrity, authentication, repudiation prevention, and the like. The one-way hash function may be HBES SHA-1.

Referring back to FIG. 1, in case that only the nodes 0, 1 and 2 want to secure a safe, or private, communication channel, they use HH(K0) as an encryption key. In doing so, the nodes 0, 1 and 2 may store HH(K0) corresponding to the encryption key or easily compute HH(K0) using a stored value. However, the node 3 cannot compute HH(K0) corresponding to the encryption key, using its stored HHH(K0).

Thus, a node excluded from the encryption communication channel, such as the node 3 in the above example, is referred to as a revoked node, and a nodes constructing the private communication channel are referred to as a privileged nodes. Therefore, in the above example, nodes 0, 1 and 2 would be the privileged nodes. The set of the nodes arranged in a circle are referred to as a node group.

To handle a large number of nodes, it is necessary to layer the structure of FIG. 1.

Figure 2:
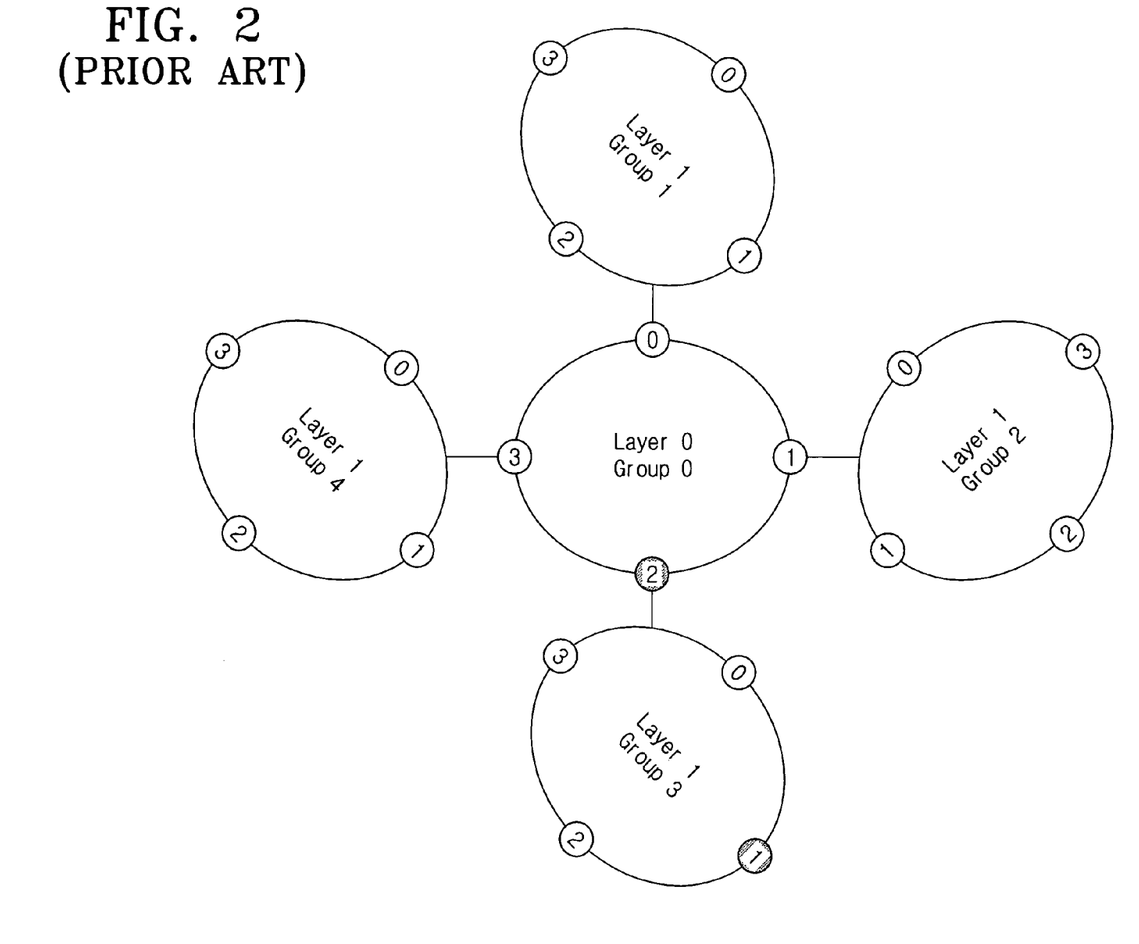
FIG. 2 is a diagram illustrating a layered structure of circular node groups of FIG. 1.

FIG. 2 depicts a layered structure of the circular node groups of FIG. 1.

As shown in FIG. 2, two layers of a layer 0 and a layer 1 are shown, and a node group at each layer consists of 4 nodes. The respective nodes are assigned the key values or key sets generated using the hash function in a manner as shown in Table 1. The nodes at the lowest layer 1 are leaf nodes.

Note that the nodes at the lower layer hold keys assigned to their parent nodes in the upper layer in the layered structure of FIG. 2. In addition, when a node is revoked from the communication channel, the parent node of the revoked node is also regarded as the revoked node.

For example, the node 3 of the node group 1 stores its assigned key set and the key set of the node 0 in the node group 0. If the node 1 of the node group 3 is revoked, the node 2 of the node group 0 is also regarded as the revoked node.

In the example, the nodes 3, 0 and 1 of the node group 0 can secure the encryption communication channel by using HH(K03), which is generated from the encryption key of the node 3 of the node group 0 K03 (0 denotes the number of the node group and 3 denotes the serial number of the node), as the encryption key.

The privileged nodes in the node group 3 can also secure the encryption communication channel by using HH(K32) generated from K32 as the encryption key.

Accordingly, a server is able to transmit the encrypted information to all the nodes but the node 1 of the node group 3 using HH(K03) and HH(K32) as the encryption key.

That is, the server transmits to the leaf nodes a temporary key encrypted using the selected encryption key as aforementioned, and content encrypted with the temporary key.

Upon receiving the encrypted data packets from the server, the leaf nodes require information as to which one of its stored keys is used to generate the encryption key and to decrypt the data packet.

Hence, when transmitting the encryption key, the server appends a tag to the data packets so that the leaf nodes can acquire the information relating to the encryption key. The tag contains information relating to the revoked nodes.

Thus, the leaf nodes can learn the encryption key of the received data packets and thus generate the encryption key by means of the information relating to the revoked nodes.

As the above examples illustrate, a transmission overhead, a storage overhead, and a computation overhead are necessary in the BE. The transmission overhead is a quantity of the header transmitted from the transmitter, the storage overhead is a quantity of a secret key stored by the user, and the computation overhead is a quantity of computation required for the user to acquire a session key. It is therefore desirable to reduce the overhead in the BE system, and specifically to reduce the transmission overhead according to the tag transmission.

SUMMARY OF THE INVENTION

According to an aspect of the present invention, there is provided a tag generation method in a BE system which takes advantage of efficient generation of a node ID of a revoked leaf node to reduce a tag size.

In accordance with an aspect of the present invention, a tag generation method for generating tags used in a broadcast encryption system, which has a layered structure and which includes a plurality of node groups each consisting of a plurality of nodes, comprises detecting at least one revoked leaf node; setting a node identification (ID) assigned to at least one node among nodes assigned node IDs at a layer 0 and to which the at least one revoked leaf node is subordinate, to a node path identification (NPID) of the at least one revoked leaf node at the layer 0; generating a tag list in the layer 0 by combining the NPID of each of the at least one revoked leaf nodes at the layer 0 in order of increment of node IDs of the corresponding at least one revoked leaf nodes; and generating a tag list in a lowest layer by repeatedly performing the setting and generation operation down to the lowest layer. The NPID may be combined with a group identifier (GID) indicative of information as to a parent node of a node corresponding to the NPID.

A first NPID at each layer may be combined with a GID 0.

In the same node group as a previous NPID, a NPID from a second NPID at each layer may be combined with the same GID as is combined with the previous NPID.

In a different node group from a previous NPID, a NPID from a second NPID at each layer may be combined with a GID which is a remainder after adding 1 to the previous NPID and dividing by 2.

The NPID may be combined with a GID of a parent node of a node corresponding to the NPID.

The node ID may be assigned as a hexadecimal, and the node group may include 16 nodes.

The lowest layer may be a layer 15.

When all leaf nodes along lower branches from a certain node in a tree topology are revoked, an NPID of the revoked leaf nodes may be substituted by a smallest NPID of the NPIDs.

The smallest NPID used for the substitution may be combined with a binary GID where '1s' as many as a certain number are consecutively arranged.

The certain number may be a log to a base 2 of a number of nodes in a node group including a node corresponding to the NPID.

A combination of NPIDs at each layer with respect to the at least one revoked leaf node may be a node ID of the at least one revoked leaf node.

BRIEF DESCRIPTION OF THE DRAWING FIGURES

These and other aspects of the present invention will become more apparent from the following description of exemplary embodiments thereof, with reference to the accompanying drawings, in which.

DETAILED DESCRIPTION OF EXEMPLARY EMBODIMENTS OF THE PRESENT INVENTION

Certain exemplary embodiments of the present invention will now be described in greater detail with reference to the accompanying drawings.

In the following description, the same drawing reference numerals are used to refer to the same elements, even in different drawings. The matters defined in the following description, such as detailed construction and element descriptions, are provided as examples to assist in a comprehensive understanding of the invention. Also, well-known functions or constructions are not described in detail, since they would obscure the invention in unnecessary detail.

Figure 3:
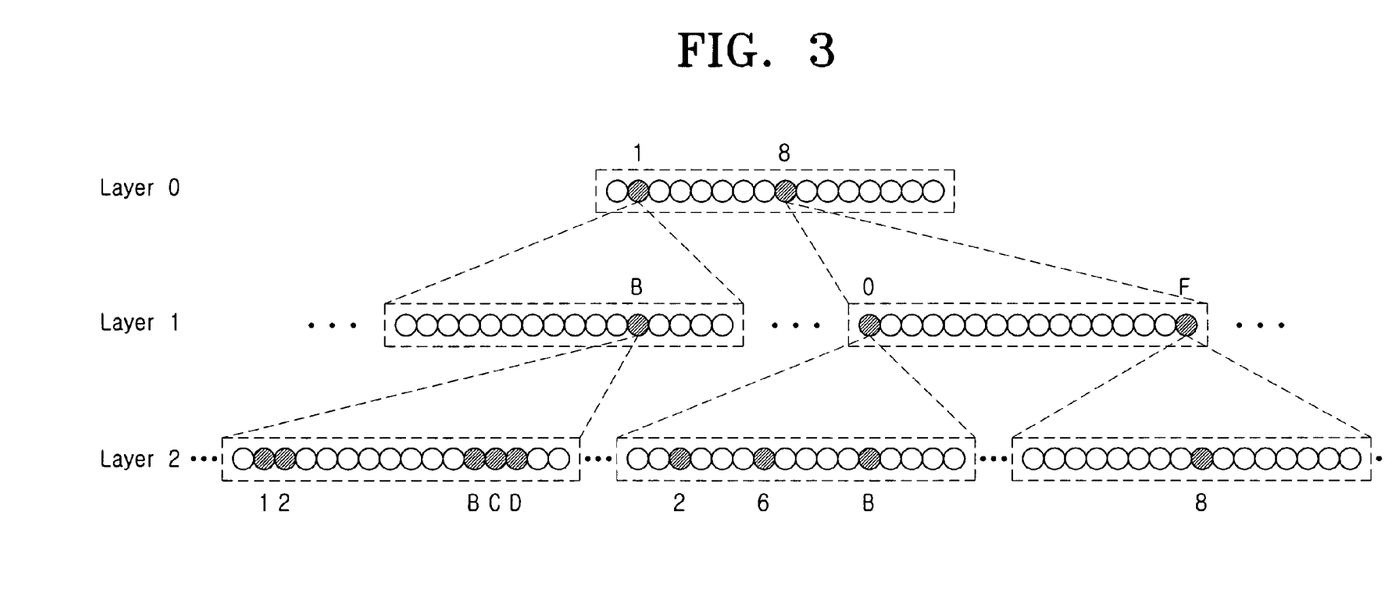
FIG. 3 is a diagram illustrating a layered structure adopting a tag generation method according to an exemplary embodiment of the present invention.

FIG. 3 depicts a layered structure adopting a tag generation method according to an exemplary embodiment of the present invention.

FIG. 3 shows that the layered structure consists of three layers 0, 1 and 2. However, any number of layers may be used. Note that each node group in FIG. 3 may be a circular node group as shown in FIG. 2. To ease the understanding, the circular formation is not illustrated in the drawings.

Referring now to FIG. 3, the layer 0 includes a node group consisting of 16 nodes. The layer 1 has a child node group built up with node groups each consisting of 16 nodes, each node group of layer 1 corresponding to a respective one of the 16 nodes at the layer 0. The node groups of layer 1 are subordinate to the 16 nodes of the layer 0, respectively. In other words, there are 16 node groups each consisting of the 16 nodes at the layer 1, and accordingly, $16^2$ nodes are present in total.

At the layer 2, a child node group includes node groups each consisting of 16 nodes for each of the respective $16^2$ nodes at the layer 1. In other words, since there are $16^2$ node groups each consisting of the 16 nodes are present at the layer 2, $16^3$ nodes are present in total. Herein, the $16^3$ nodes at the lowest layer 2 are referred to as leaf nodes.

In this exemplary embodiment of the present invention, the layered structure may include 16 layers, that is, layers 0 through 15. In this case, the layer 15 has a child node group built up with node groups each consisting of 16 nodes for the respective $16^{15}$ nodes at the layer 14. That is, there are $16^{15}$ node groups each consisting of 16 nodes at the layer 15, and accordingly, $16^{16}$ nodes, that is, $16^{16}$ leaf nodes are present in total.

Hereafter, how to determine a node identifier (node ID) of a leaf node is described in detail.

In this exemplary embodiment of the present invention, hexadecimals from 0 to F are assigned to the nodes in each node group of FIG. 3 according to an order, as their serial numbers. Provided that the number of nodes in each node group is N, the serial numbers from 0 to N-1 are assigned to the nodes in each node group.

In FIG. 3, according to the tag generation method of an exemplary embodiment of the present invention, the node ID of the leaf node is a consecutive arrangement of the serial numbers assigned to the nodes, to which the leaf node is subordinate, at the layers 0 through 15. Hereafter, the serial number at each layer is referred to as a node path identifier (NPID) at each layer with respect to the corresponding leaf node. In conclusion, the arrangement of the NPIDs at the layers is the node ID of the corresponding leaf node.

Table 2 shows the determination of the node ID of the leaf node according to the tag generation method of the present invention.

TABLE 2

|  | i | ii | iii | iv | v | vi | vii | viii | ix |
|---|---|---|---|---|---|---|---|---|---|
| Layer 0 | 1 | 1 | 1 | 1 | 1 | 8 | 8 | 8 | 8 |
| Layer 1 | B | B | B | B | B | 0 | 0 | 0 | F |
| Layer 2 | 1 | 2 | B | C | D | 2 | 6 | B | 8 |

Still referring to FIG. 3, the leaf node indicated by solid circle at the layer 2 denotes the revoked leaf node. Provided that 9 nodes are revoked in total, the node ID of each revoked leaf node is created according to the following scheme.

Priority 1: the order from the upper layer to the lower layer.
Priority 2 at the same layer, the smaller NPID assigned to the parent node.
Priority 3: in the same node group, the smaller NPID of the corresponding node group.

According to the priorities, in case of the node ID of the revoked leaf node i, a NPID '1' is assigned to its parent node at the layer 0 being the highest layer. '1' becomes the NPID of the revoked leaf node i at the layer 0. Next, the NPID 'B' is assigned to the parent node of the node i, at the layer 1. 'B' becomes the NPID of the revoked leaf node i at the layer 1. Lastly, the NPID '1' is assigned to the revoked leaf node i at the layer 2. '1' becomes the NPID of the revoked leaf node i at the layer 2. As such, the node ID of the revoked leaf node is determined to be [1, B, 1].

As for the node ID of the revoked leaf node vi, the parent node of the node vi, at the layer 0 being the highest layer, is assigned a NPID '8'. '8' becomes the NPID of the revoked leaf node vi at the layer 0. Next, the parent node of the node vi, at the layer 1, is assigned a NPID '0'. '0' becomes the NPID of the revoked leaf node vi at the layer 1. Lastly, an NPID '2' is assigned to the revoked leaf node vi at the layer 2. '2' becomes the NPID of the revoked leaf node vi at the layer 2. As such, the node ID of the revoked leaf node vi is determined to [8, 0, 2].

Table 3 shows the rearrangement in the line writing direction of the determined node IDs of the revoked leaf nodes of Table 2.

TABLE 3

| Layer 0 | | | | | | | | | Layer 1 | | | | | | | | Layer 2 | | | | | | | |
|---|---|---|---|---|---|---|---|---|---|---|---|---|---|---|---|---|---|---|---|---|---|---|---|---|
| 1 | 1 | 1 | 1 | 1 | 8 | 8 | 8 | 8 | B | B | B | B | B | 0 | 0 | 0 | F | 1 | 2 | B | C | D | 2 | 6 | B | 8 |

However, in practice, when transmitting the tag information to the leaf node, a group ID (GID) is appended to the NPID. Table 4 shows the combination of the GID according to an exemplary embodiment of the present invention.

TABLE 4

| | Layer 0 | | | | | | | | | Layer 1 | | | | | | | | Layer 2 | | | | | | | |
|---|---|---|---|---|---|---|---|---|---|---|---|---|---|---|---|---|---|---|---|---|---|---|---|---|---|
| GID | 0 | 0 | 0 | 0 | 0 | 0 | 0 | 0 | 0 | 1 | 1 | 1 | 1 | 1 | 8 | 8 | 8 | 8 | B | B | B | B | 0 | 0 | 0 | F |
| NPID | 1 | 1 | 1 | 1 | 1 | 8 | 8 | 8 | 8 | B | B | B | B | B | 0 | 0 | 0 | F | 1 | 2 | B | C | D | 2 | 6 | B | 8 |

In Table 4, the GID combined with the NPID at each layer becomes the NPID of the parent node of the node at each layer corresponding to the revoked leaf node. Note that the GID at the layer 0 is '0' because the node corresponding to the revoked leaf node, at the layer 0, has no parent node.

That is, the NPID is combined with the GID that is the NPID of the parent node of the node corresponding to the NPID.

Table 5 shows tag tables transmitted to the leaf nodes when the GIDs are combined as shown in Table 4.

TABLE 5

| Tag table | 01 | 01 | 01 | 01 | 01 | 08 | 08 | 08 | 08 | Layer 0 |
| | 1B | 1B | 1B | 1B | 1B | 80 | 80 | 80 | 8F | Layer 1 |
| | B1 | B2 | BB | BC | BD | 02 | 06 | 0B | F8 | Layer 2 |

Table 6 shows the combination of the GID according to an alternative embodiment of the present invention.

TABLE 6

| | Layer 0 | | | | | | | | Layer 1 | | | | | | | Layer 2 | | | | | | | | |
|---|---|---|---|---|---|---|---|---|---|---|---|---|---|---|---|---|---|---|---|---|---|---|---|---|
| GID | 0 | 0 | 0 | 0 | 0 | 0 | 0 | 0 | 0 | 0 | 0 | 0 | 0 | 0 | 1 | 1 | 1 | 1 | 0 | 0 | 0 | 0 | 1 | 1 | 1 | 0 |
| NPID | 1 | 1 | 1 | 1 | 1 | 8 | 8 | 8 | 8 | B | B | B | B | B | 0 | 0 | 0 | F | 1 | 2 | B | C | D | 2 | 6 | B | 8 |

In Table 6, the first NPID at each layer is combined with the GID '0'. The NPID from the second NPID at each layer is combined with the same GID as the GID of the previous NPID within the same node group as the previous NPID.

By contrast, in the different node group from the previous NPID, the NPID after the second NPID at each layer is combined with the GID that is the remainder after adding '1' to the previous NPID and dividing it by '2'. More specifically, in case that the NPID from the second NPID at each layer is in the different node group from the previous NPID, the previous GID '1' becomes '0' and the previous GID '0' becomes '1'.

Table 7 shows tag tables transmitted to the respective leaf nodes according to the GID combination method as shown in Table 6.

TABLE 7

| Tag table | 01 | 01 | 01 | 01 | 01 | 08 | 08 | 08 | 08 | Layer 0 |
|---|---|---|---|---|---|---|---|---|---|---|
| | 0B | 0B | 0B | 0B | 0B | 10 | 10 | 10 | 1F | Layer 1 |
| | 01 | 02 | 0B | 0C | 0D | 12 | 16 | 1B | 08 | Layer 2 |

In this exemplary embodiment of the present invention, it can be assumed that all leaf nodes subordinate to a node at the specific layer are fully revoked.

Figure 4:
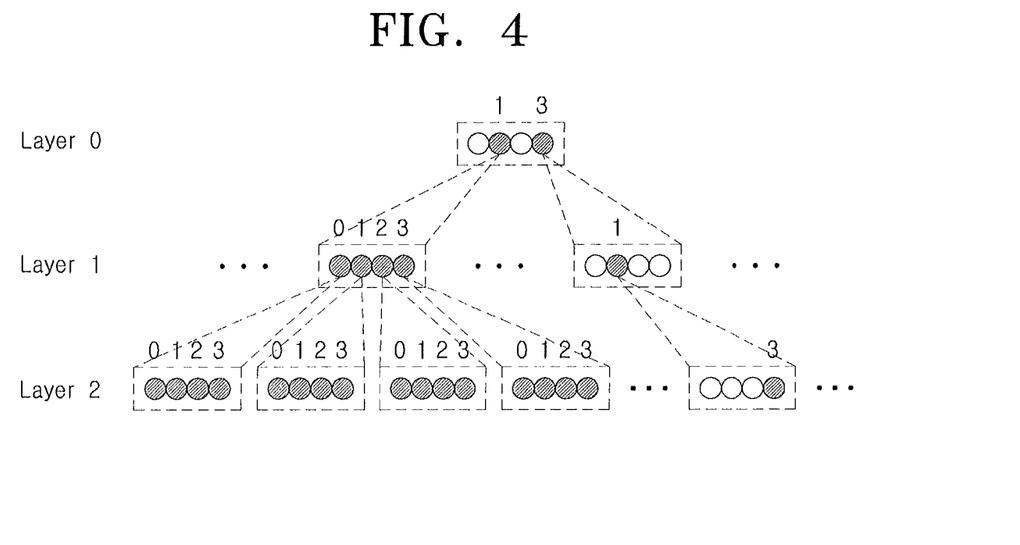
FIG. 4 is a diagram illustrating the revocation of all leaf nodes subordinate to a node at a certain layer according to an exemplary embodiment of the present invention.

FIG. 4 depicts the full revocation of all leaf nodes subordinate to a node at the specific layer according to an exemplary embodiment of the present invention.

In FIG. 4, the layered structure consists of three layers 0, 1 and 2. However, this is only an example, and the layered structure may have any number of layers. As shown in FIG. 4, the layer 0 includes a node group consisting of 4 nodes. The layer 1 has a child node group built up with node groups each consisting of 4 nodes for the 4 nodes at the layer 0, respectively. In other words, since there are 4 node groups each consisting of the 4 nodes at the layer 1, $4^2$ nodes are present in total.

At the layer 2, a child node group is built up with node groups each consisting of 4 nodes for the $4^2$ nodes at the layer 1, respectively. In other words, since there are $4^2$ node groups each consisting of the 4 nodes at the layer 2, $4^3$ nodes are present in total. Herein, the $4^3$ nodes at the lowest layer 2 are referred to as leaf nodes.

In this exemplary embodiment of the present invention, the layered structure may include 16 layers of layers 0 through 15. Accordingly, there would be 16 nodes in each node group. In this case, the layer 15 has a child node group built up with node groups each consisting of 16 nodes for the respective $16^{15}$ nodes at the layer 14. That is, there are $16^{15}$ node groups each consisting of 16 nodes at the layer 15, and accordingly, $16^{16}$ nodes, that is, $16^{16}$ leaf nodes are present in total.

Still referring to FIG. 4, as one can see, all leaf nodes subordinate to the second node in the node group at the layer 0 are revoked, and one of the leaf nodes subordinate to the fourth node in the node group at the layer 0 is revoked.

Table 8 shows the node ID of the revoked leaf nodes in accordance with Table 2.

TABLE 8

| | Leaf node | | | | | | | | | | | | | | | | |
|---|---|---|---|---|---|---|---|---|---|---|---|---|---|---|---|---|---|
| | a | b | c | d | e | f | g | h | i | j | k | l | m | n | o | p | q |
| Layer 0 | 1 | 1 | 1 | 1 | 1 | 1 | 1 | 1 | 1 | 1 | 1 | 1 | 1 | 1 | 1 | 1 | 3 |
| Layer 1 | 0 | 0 | 0 | 0 | 1 | 1 | 1 | 1 | 2 | 2 | 2 | 2 | 3 | 3 | 3 | 3 | 1 |
| Layer 2 | 0 | 1 | 2 | 3 | 0 | 1 | 2 | 3 | 0 | 1 | 2 | 3 | 0 | 1 | 2 | 3 | 3 |

In reference to FIG. 4 and Table 8, the parent nodes of the revoked nodes are in the same group at the layer 1. These parent nodes at the layer 1 have the common parent rode at the layer 0.

In this exemplary embodiment of the present invention, the node IDs of the revoked leaf nodes a through p are substituted by the node ID of the revoked leaf node a. The substituted node IDs are shown in Table 9.

TABLE 9

| Leaf node | a~p | q |
|---|---|---|
| Layer 0 | 1 | 3 |
| Layer 1 | 0 | 1 |
| Layer 2 | 0 | 3 |

In event that all leaf nodes, which are subordinate to lower branches from a specific node, are revoked in the layered structure, the NPID of the revoked leaf nodes is substituted by the smallest NPID among the NPIDs of the revoked leaf nodes at the respective layers.

Table 10 show the GID combination method in FIG. 4.

TABLE 10

| | Layer 0 | | Layer 1 | | Layer 2 | |
|---|---|---|---|---|---|---|
| GID | 0 | 0 | 1111(2) | 0 | 1111(2) | 0 |
| NPID | 1 | 3 | 0 | 1 | 0 | 3 |

Referring to Tables 8, 9 and 10, the node ID [1, 0, 0] which substitutes the node IDs of the revoked leaf nodes a through p, (hereafter, referred to as a representative node ID) consists of the NPIDs [1], [0] and [0]. Among them, while the NPID [1] at the layer 0 was the duplicate NPID of the revoked leaf nodes a through p, the NPIDs [0] and [0] at the layers 1 and 2 substitute for the NPIDs [0], [1], [2] and [3] of the leaf nodes a through p at the layers 1 and 2, respectively.

Of the NPIDs constituting the representative node ID, the NPID at the layer 0 has no substituting NPID. Thus, the substitution is not indicated. Instead, in the manner as shown in Table 6, the NPID [1] is combined with the GID '0' as the first NPID at the layer.

Of the NPIDs constituting the representative node ID, the NPIDs [0] and [0] at the layers 1 and 2, respectively, substitute for the NPIDs [0], [1], [2] and [3] of the leaf nodes a through p. To represent this substitution, a binary GID in which '1's as many as a certain number are consecutively arranged, for example, $11, \ldots, 11_{(2)}$, is combined.

In this embodiment of the present invention, the cipher of the GID may be determined according to the number of types of the substituted NPIDs. When four types of the NPIDs are substituted as shown in FIG. 4, the GID is $11_{(2)}$. On the other hand, provided that the node group consists of 16 nodes, the GID is $1111_{(2)}$.

It can be said that the cipher of the GID is $\log_2 t$ wherein t is the number of nodes in the node group to which the node corresponding to the NPID of the representative node ID belongs.

In Table 10, aside from the NPIDs constituting the representative node ID, the GID of other NPID is determined as shown in Table 6.

Specifically, within the same node group as the previous NPID, the NPID at the layer is combined with the same GID as combined to the previous NPID.

By contrast, in the different node group from the previous NPID, the NPID from the NPID at the layer is combined with the GID that is the remainder after adding '1' to the previous NPID and dividing it by '2'.

Table 11 shows tag tables transmitted to the leaf nodes when the GID is combined in the manner as shown in Table 10.

TABLE 11

| Tag table | 01 | 03 | Layer 0 |
|---|---|---|---|
| | 11(2)0 | 01 | Layer 1 |
| | 11(2)0 | 03 | Layer 2 |

Figure 5:
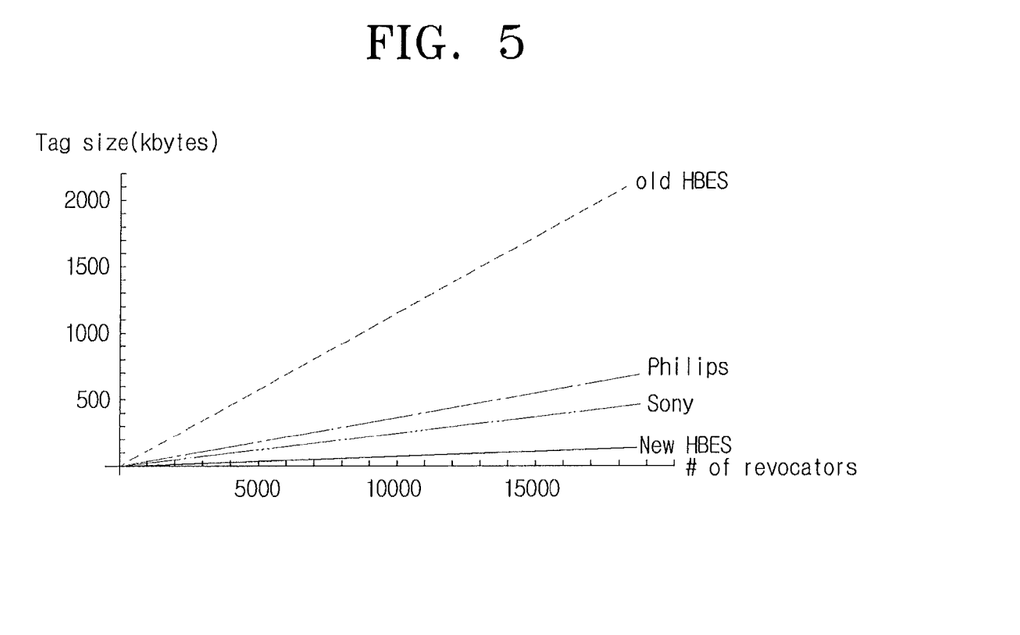
FIG. 5 is a graph illustrating the tag size according to the tag generation method according to an exemplary embodiment of the present invention.

FIG. 5 is a graph comparing the tag size between the tag generation method according to an exemplary embodiment of the present invention and the conventional tag generation method as disclosed in U.S. Published Patent Application No. 20020147906.

As shown in FIG. 5, it is apparent that the tag size 100 of an exemplary embodiment of present invention is much smaller than the tag size 200 of the above literature. In case that only one leaf node is revoked, the method according to an exemplary embodiment of present invention can reduce the tag size by about 65 times than the above literature. In case of 16 revoked leaf nodes, the method according to an exemplary embodiment of the present invention can reduce the tag size by about 61 times that of the above literature.

In addition, as for 256 revoked leaf nodes, the tag size is reduced by about 57 times, and as for 65,536 revoked leaf nodes, the tag size is reduced by about 49 times. As for 4.2 billion revoked leaf nodes, the tag size is reduced by about 32 times.

As set forth above, exemplary embodiments of the present invention can drastically reduce the transmission overhead at the server in the BE system owing to the reduced tag size.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A tag generation method for generating tags used in a broadcast encryption system which has a layered structure and which includes a plurality of node groups each consisting of a predetermined number of nodes, the method comprising:
    detecting at least two revoked leaf nodes;
    setting a node identification (ID) assigned to at least one node among nodes assigned node IDs at a layer 0 and to which the at least two revoked leaf nodes are subordinate, to a node path identification (NPID) of the at least two revoked leaf nodes at the layer 0;
    generating, by a server device, a tag list in the layer 0 by combining the NPID of each of the at least two revoked leaf nodes at the layer 0 in incrementing order of node IDs of the corresponding at least two revoked leaf nodes; and
    generating a tag list in layers below the layer 0 by performing the setting operation in each layer below the layer 0 and generating a tag list for each layer below the layer 0 by combining the NPID of each of the at least two revoked leaf nodes at each layer below the layer 0 in incrementing order of node IDs of the corresponding at least two revoked leaf nodes;
    wherein the tag list generated in each layer includes all of the combined NPID's for a single layer and the tag list generated at each layer is a sequential combination of NPIDs of the layer in which each NPID is a hexadecimal representation of a node to which at least two revoked leaf nodes are subordinate, and the number of NPIDs of the tag list at each layer is equivalent to the number of revoked leaf nodes.

2. The tag generation method of claim 1, wherein the NPID is combined with a group ID (GID) indicative of information as to a parent node of a node corresponding to the NPID.

3. The tag generation method of claim 2, wherein a first NPID at each layer is combined with a GID 0.

4. The tag generation method of claim 3, wherein, a second NPID, within a first node group of the plurality of node groups, at each layer is combined with a same GID that is combined with the first NPID.

5. The tag generation method of claim 3, wherein, a second NPID, within a second node group different from a first node group corresponding to the first NPID, at each layer is combined with a GID which is a remainder after adding 1 to the first NPID and dividing by 2.

6. The tag generation method of claim 2, wherein, when all leaf nodes along lower branches from a certain node in a tree topology are revoked, an NPID of the revoked leaf nodes is substituted by a smallest NPID of the NPIDs.

7. The tag generation method of claim 6, wherein the smallest NPID used for the substitution is combined with a binary GID where '1s' as many as a defined number are consecutively arranged.

8. The tag generation method of claim 7, wherein the defined number is a log to a base 2 of a number of nodes in a node group including a node corresponding to the NPID.

9. The tag generation method of claim 1, wherein the NPID is combined with a GID of a parent node of a node corresponding to the NPID.

10. The tag generation method of claim 1, wherein the node ID is assigned as a hexadecimal, and each node group of the plurality of node groups comprises 16 nodes.

11. The tag generation method of claim 1, wherein the lowest layer is a layer 15.

12. The tag generation method of claim 1, wherein a combination of NPIDs at each layer with respect to the at least two revoked leaf nodes are node IDs of the at least two revoked leaf nodes.

13. A method for generating a list of excluded nodes, the method comprising:
    detecting at least two excluded leaf nodes;
    recognizing identifications (IDs) assigned to parent nodes of the at least two excluded leaf nodes;
    setting a node identification (ID) assigned to at least one node among nodes assigned node IDs at all layers of the at least two excluded leaf nodes to a node path identification (NPID) of the at least two excluded leaf nodes at all of the layers; and generating, by a server device, a list of excluded nodes by sequentially arranging the NPIDs assigned to the parent nodes and NPIDs assigned to the excluded leaf nodes, wherein the generating the list of excluded nodes comprises combining 0) NPIDs of parent nodes at a layer 0 of the excluded leaf nodes, 1) NPIDs of parent nodes at a layer 1 of the excluded leaf nodes, 2) NPIDs of parent nodes at a layer 2 of the excluded leaf nodes, . . . , n−2) NPIDs of parent nodes at a layer n−2 of the excluded leaf nodes, and n−1) NPIDs of the excluded leaf nodes at a layer n−1, wherein the list generated at each layer is a sequential combination of NPIDs of the layer in which each NPID is a hexadecimal representation of a node to which at least one excluded leaf node is subordinate, and the number of NPIDs of the list at each layer is equivalent to the number of excluded leaf nodes.

14. The method of claim 13, wherein each of the IDs of the excluded leaf nodes comprise a node path ID (NPID) determined according to an order of the excluded leaf nodes in a group containing the excluded leaf nodes and a group ID (GID) indicating the group containing the excluded leaf nodes, and wherein each of the IDs of the parent nodes comprise a node path ID (NPID) determined according to an order of the parent nodes in a group containing the parent nodes and a group ID (GID) indicating the group containing the parent nodes.

15. The method of claim 14, wherein the GID is assigned as a first value to a first node at each layer, wherein, in a same group as a first node, the GID is assigned as the first value to a node from a second node at each layer, and wherein, in a second group different from the group of the first node, the GID is assigned as a second value to a node from a second node at each layer.

16. The method of claim 15, wherein the second value is a remainder after adding '1' to the first value and dividing by '2'.

17. The method of claim 15, wherein, when the first node at each layer is a node in which all child nodes are excluded nodes, and when the first node at each layer is a child node of a node in which not all child nodes of the parent node of the first node are excluded, the GID is assigned as a third value.

18. The method of claim 15, wherein, when the node from the second node at each layer is a node in which all child nodes are excluded, and when the node from the second node at each layer is a child node of a node in which not all child nodes of the parent node of the node are excluded, the GID is assigned as a third value.

19. A method for generating a list of excluded nodes, the method comprising:

detecting at least two excluded leaf nodes;

recognizing identifications (IDs) assigned to first parent nodes which are parent nodes of the at least two excluded leaf nodes;

setting a node identification (ID) assigned to at least one node among nodes assigned node IDs at a layer 0 and to which the at least two excluded leaf nodes are subordinate to a node path identification (NPID) of the at least two excluded leaf nodes at the layer 0; and generating, by a server device, a list in which NPIDs formed by arranging the NPIDs assigned to the first parent nodes and an NPID assigned to the at least two excluded leaf nodes are contained as excluded node NPIDs, wherein the excluded nodes are layered from a layer 0 to a layer n−1, wherein the first excluded leaf node is contained in the layer n−1, and wherein the NPIDs of the first parent nodes comprise NPIDs of first parent nodes at the layer 0, NPIDs of first parent nodes at a layer 1, . . . , and NPIDs of first parent nodes at a layer n−2, wherein the list generated at each layer is a sequential combination of NPIDs of the layer in which each NPID is a hexadecimal representation of a node to which the at least two excluded leaf nodes are subordinate, and the number of NPIDs of the list at each layer is equivalent to the number of excluded leaf nodes.

20. The method of claim 19, wherein the ID of the first excluded leaf node comprises a node path ID (NPID) determined according to an order of the first excluded leaf node in a group containing the first excluded leaf node, and wherein each of the IDs of the first parent nodes comprise a node path ID (NPID) determined according to an order of the first parent nodes in a group containing the first parent nodes.

21. The method of claim 19, further comprising:

recognizing IDs assigned to second parent nodes which are parent nodes of a second excluded leaf node, wherein the generating comprises generating a list in which IDs formed by arranging the IDs assigned to the first parent nodes and an ID assigned to the first excluded leaf node are contained as first excluded node IDs, and in which IDs formed by arranging the IDs assigned to the second parent nodes and an ID assigned to the second excluded leaf node are contained as second excluded node IDs.

22. The method of claim 21, wherein the excluded nodes are layered from a layer 0 to a layer n−1, wherein the first excluded leaf node and the second excluded leaf node are contained in the layer n−1, and wherein the generating comprises generating the list of the excluded nodes by arranging an ID of a first parent node at the layer 0, an ID of a second parent node at the layer 0, an ID of a first parent node at a layer 1, an ID of a second parent node at the layer 1, . . . , an ID of a first parent node at a layer n−2, an ID of a second parent node at the layer n−2, an ID of the first leaf node, and an ID of the second leaf node.

23. The method of claim 22, wherein the ID of the first excluded leaf node comprises a node path ID (NPID) determined according to an order of the first excluded leaf node in a group containing the first excluded leaf node, wherein the ID of the second excluded leaf node comprises a node path ID (NPID) determined according to an order of the second excluded leaf node in a group containing the second excluded leaf node, wherein each of the IDs of the first parent nodes comprise a node path ID (NPID) determined according to an order of the first parent nodes in a group containing the first parent nodes, and wherein each of the IDs of the second parent nodes comprise a node path ID (NPID) determined according to an order of the second parent nodes in a group containing the second parent nodes.

* * * * *